April 28, 1953  W. M. CUTLER ET AL  2,636,169
NAIL DISTRIBUTOR
Original Filed Dec. 17, 1948  10 Sheets-Sheet 3

Inventors
Wallace M. Cutler
Edwin S. Kant
Henry B. Greenough, Dec'd.
Mary R. Greenough, Admx.
By their Attorney April 28, 1953 W. M. CUTLER ET AL 2,636,169
NAIL DISTRIBUTOR Original Filed Dec. 17, 1948 10 Sheets-Sheet 4

Inventors
Wallace M. Cutler
Edwin S. Kant
Henry B. Greenough, Dec'd.
Mary R. Greenough, Admx.
By their Attorney April 28, 1953 W. M. CUTLER ET AL 2,636,169
NAIL DISTRIBUTOR
Original Filed Dec. 17, 1948 10 Sheets-Sheet 5

Inventors
Wallace M. Cutler
Edwin S. Kant
Henry B. Greenough, Dec'd
Mary R. Greenough, Admx.
By their Attorney

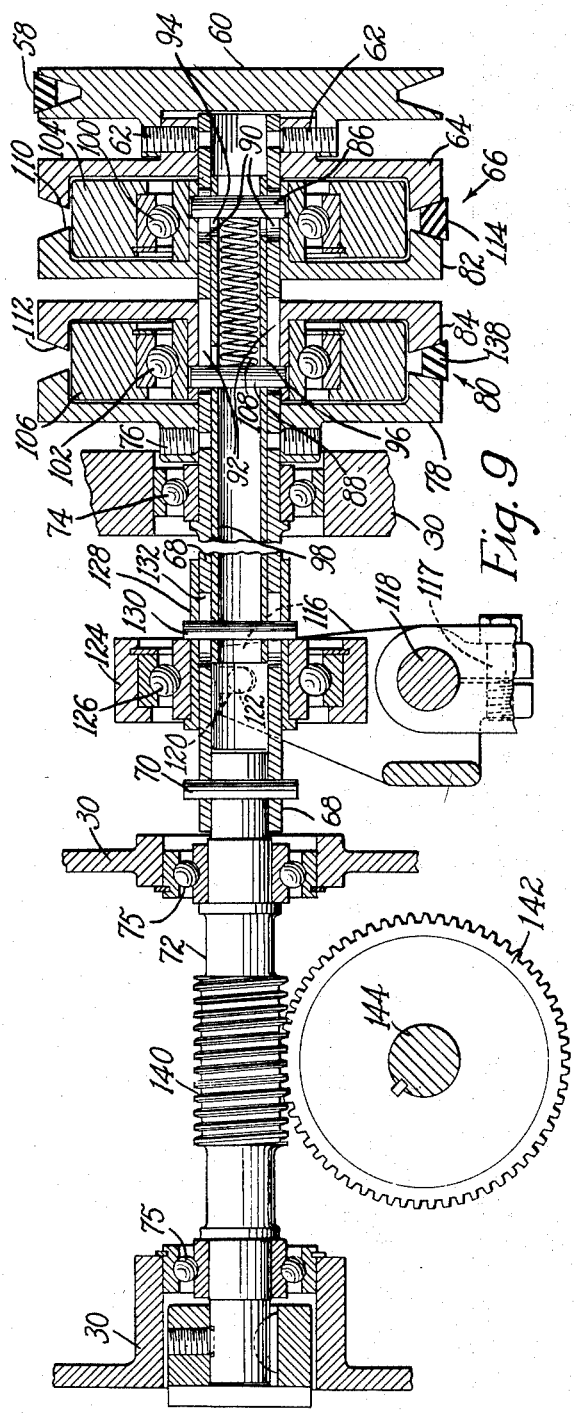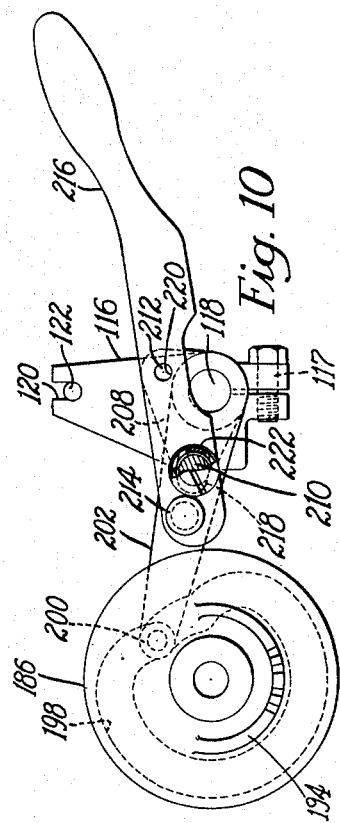

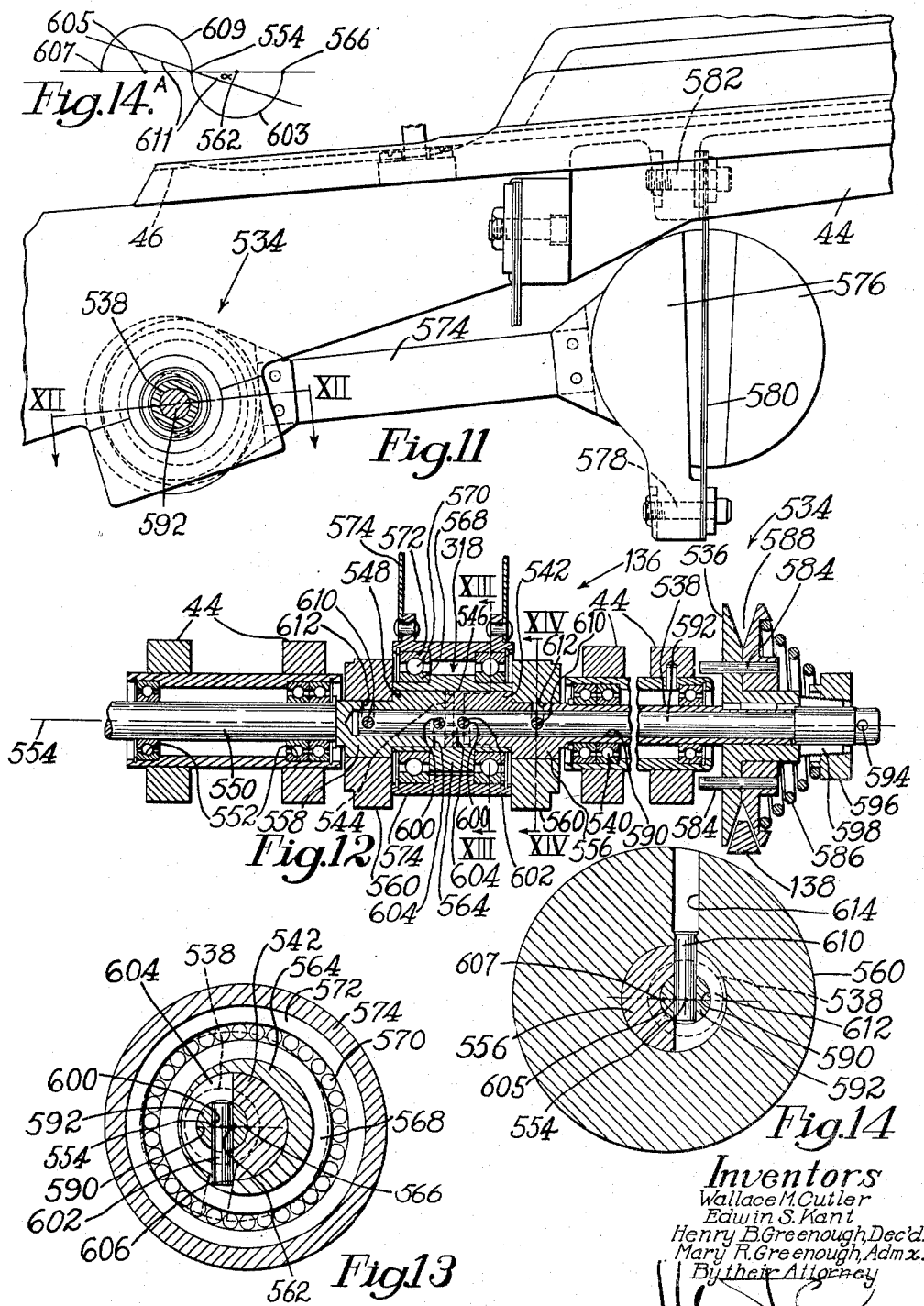

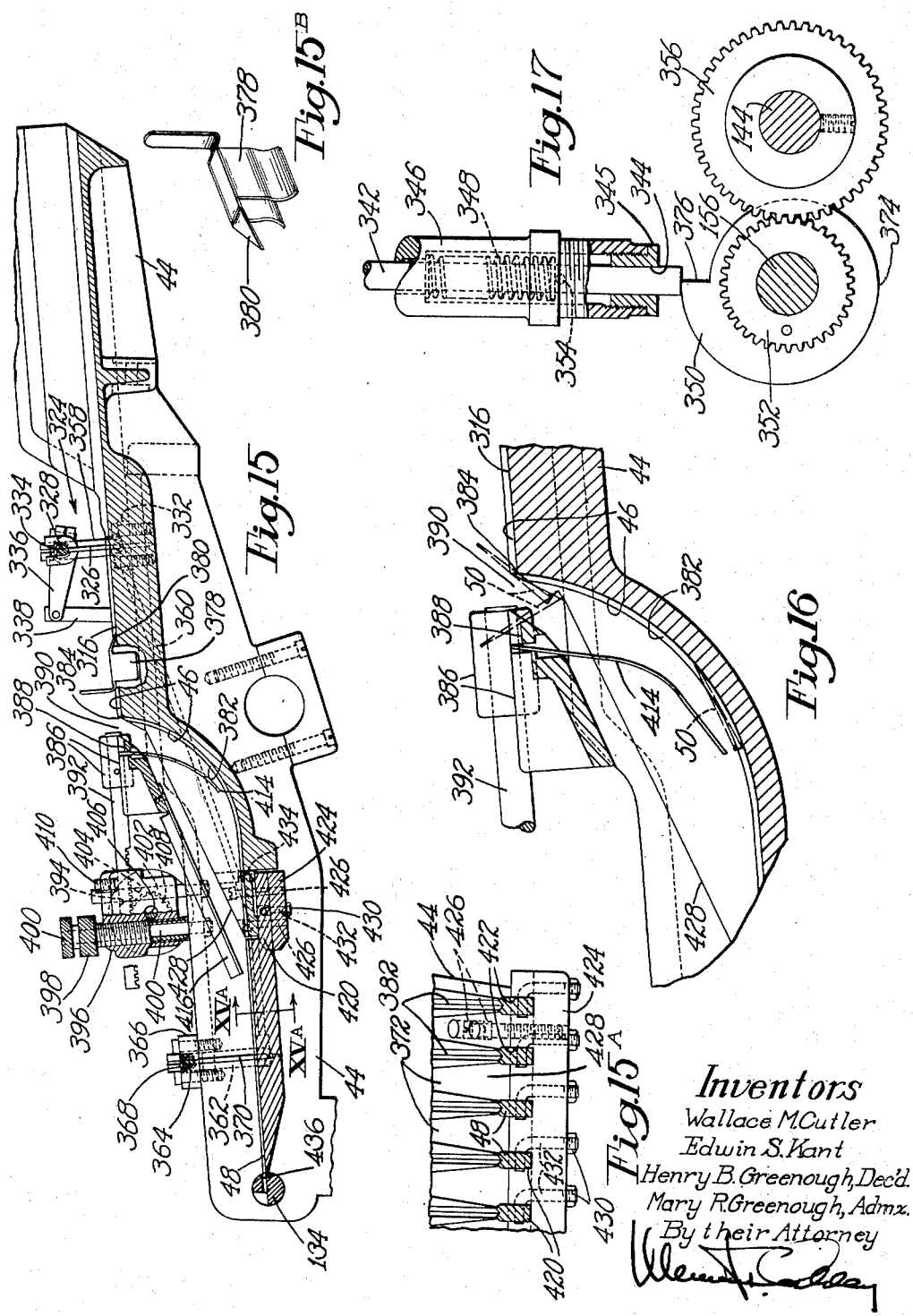

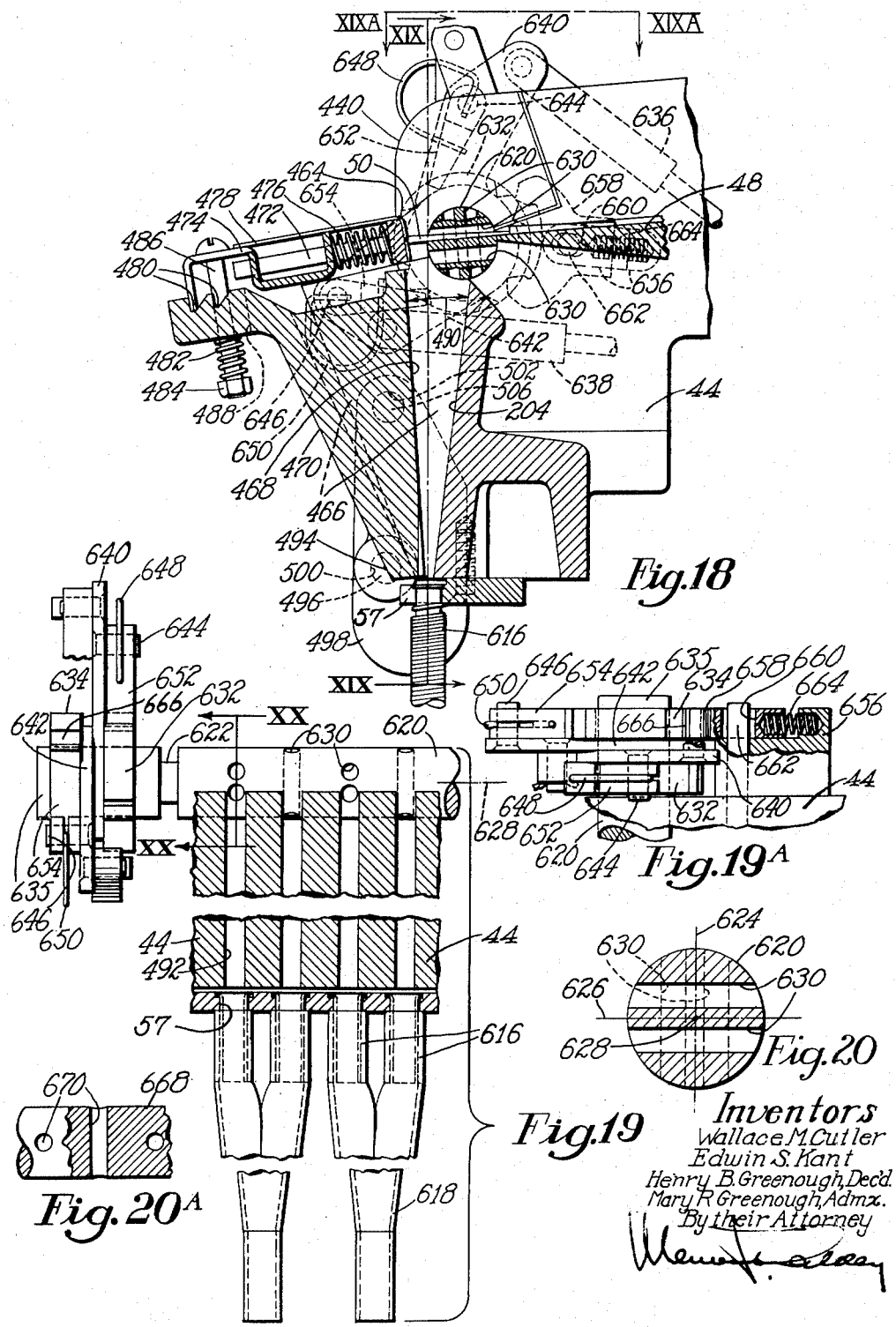

April 28, 1953 W. M. CUTLER ET AL 2,636,169
NAIL DISTRIBUTOR
Original Filed Dec. 17, 1948 10 Sheets-Sheet 10

Inventors
Wallace M. Cutler
Edwin S. Kant
Henry B. Greenough, Dec'd.
Mary R. Greenough, Adm x.
By their Attorney Patented Apr. 28, 1953

2,636,169

UNITED STATES PATENT OFFICE 2,636,169

NAIL DISTRIBUTOR

Wallace M. Cutler, Gloucester, Mass., Henry B. Greenough, deceased, late of Beverly, Mass., by Mary R. Greenough, administratrix, Beverly, Mass., and Edwin S. Kant, Melrose, Mass., assignors to United Shoe Machinery Corporation, Flemington, N. J., a corporation of New Jersey Original application December 17, 1948, Serial No. 65,868. Divided and this application June 9, 1951, Serial No. 230,758

16 Claims. (Cl. 1—39)

1

This invention relates to distributors for fastenings and is illustrated as embodied in a nail distributor for use with a heel attaching machine.

As explained in an application for United States Letters Patent Serial No. 65,868, filed December 17, 1948, of which the present application is a division, and issued as U. S. Letters Patent No. 2,604,624, on July 29, 1952, and United States Letters Patent No. 1,381,240 granted June 14, 1921, on an application filed in the name of Joseph H. Pope, there is disclosed a nail distributor having a nail carrier which is vibrated upon vertically disposed rocker arms opeartively connected to an eccentric drive rotatable in a base of the distributor, said base being bolted to the machine frame of a heel attaching machine with which the distributor is used. Vibratory movement of such a distributor shakes the heel attaching machine excessively and causes considerable wear and tear on the distributor itself, with the result that the distributor has to be serviced frequently. Moreover, the frequency of vibration of the distributor of the above-mentioned type cannot be increased without unduly shaking the heel attaching machine upon which it is mounted and losing control of the nails in the distributor. Furthermore, it is desirable, both from economical and mechanical viewpoints to provide distributors in small units, one or more of which may be supplied in accordance with the requirements of the work which the heel attaching machine is to operate upon. Heretofore it has been impossible to supply distributors as separate small units for use upon a single frame of a heel attaching machine because the vibration of one distributor rendered it difficult if not impossible to control the nails in the other distributor or distributors.

It is an object of the present invention to provide an improved distributor which is smooth and reliable in its operation and will effectively handle nails of all lengths and which will stand up under constant use with a minimum of repair and will not impart any substantial amount of vibration to the heel attaching machine served by it.

With the above object in view the illustrative nail distributor comprises a nail carrier which is yieldable in a substantially horizontal path and has mounted in it a powered unit including an element which is displaced generally lengthwise of said path, and a resisting or reacting member which is operatively connected to said element, the carrier being moved lengthwise of said path in response to movement of said element.

In the illustrative construction the nail carrier is mounted upon the upper ends of vertically disposed leaf springs supported by a base secured to a frame of a heel attaching machine, the opposite sides of the leaf springs facing generally lengthwise of nail guideways or raceways of the machine so that said carrier may be moved in a horizontal path extending generally lengthwise of said guideways or raceways but not substantially widthwise or heightwise of the carrier.

The powered unit which is rotatable in the carrier comprises an eccentric and mounted upon said eccentric is one end of a connecting rod. The above-mentioned resisting member has the form of a heavy weight and is secured to the lower ends of leaf springs which are secured at their upper ends to the carrier and have their sides facing generally lengthwise of the path of movement of the carrier. When the powered unit is rotated the connecting rod displaces the heavy weight with relation to the carrier in a horizontal direction upon the leaf springs which support the weight, the resistance offered by said weight causing the carrier to be moved in an opposite direction on its supporting springs, the relative masses of the carrier and the weight being such that the carrier has a horizontal displacement about one-third of that of the weight.

The throw of the connecting rod, and accordingly the horizontal displacement of the carrier, may be varied by changing the eccentricity of the eccentric in the powered unit. In order to insure that the carrier shall not deviate substantially from a horizontal path as it vibrates, the powered unit in accordance with another feature of the invention, comprises mechanism which is movable in response to adjustment of the eccentric and is operatively connected to counterweights of said unit in order to counterbalance said unit irrespective of the eccentricity and accordingly the throw of the eccentric.

The present invention consists in the above and other novel features hereinafter described, reference being had to the accompanying drawings which illustrate embodiments of the invention selected for purposes of illustration, said invention being fully set forth in the following description and claims.

In the accompanying drawings:

Fig. 9 is a section on line IX—IX of Fig. 3, or looking to the right on the axis of the pulley 60 in Fig. 1, showing portions of a main drive mounted in a base of the distributor;

Fig. 10 is a view on line X—X of Fig. 3 showing portions of cam and manually operated mechanism for stopping vibration of the carrier of the nail distributor;

Fig. 11 is a side elevation, partly broken away, showing a portion of the nail carrier and portions of mechanism for vibrating said carrier;

Fig. 12 is a section, partly broken away, on line XII—XII of Fig. 11 showing a dynamically counterbalanced variable displacement drive for vibrating the nail carrier;

Fig. 13 is a section on line XIII—XIII of Fig. 12 showing in detail mechanism for varying the amplitude of vibration of the carrier;

Fig. 14 is a section on line XIV—XIV of Fig. 12 showing portions of mechanism for automatically counterbalancing the variable displacement drive;

Fig. 14A is a diagram illustrating the paths of travel of centers of mass of an eccentric and an adjacent half of a connecting rod on the one hand and a counterweight on the other hand, as the throw of the eccentric is varied;

Fig. 15 is a section on line XV—XV of Fig. 2 showing raceway and nailway portions of the carrier;

Fig. 15A is a section on line XVA—XVA of Fig. 15, showing means for securing the nailways in their proper operating relations to the raceways;

Fig. 15B shows in perspective a nail stop used, as illustrated in Fig. 15, to "close," when desirable, raceways of the carrier;

Fig. 16 shows on an enlarged scale a central part of the section shown in Fig. 15;

Fig. 17 is a detail view showing in side elevation portions of mechanism for operating raceway and nailway clearers of the nail distributor;

Fig. 18 is a vertical section showing the forward end of the nail carrier equipped with a modified nail roll and nail roll operating mechanism;

Fig. 19 is a section on line XIX—XIX of Fig. 18;

Fig. 19A is a view on line XIXA—XIXA of Fig. 18 showing in plan portions of nail roll operating mechanism;

Fig. 20 is a section on line XX—XX of Fig. 19 showing in detail the modified nail roll;

Figure 21:
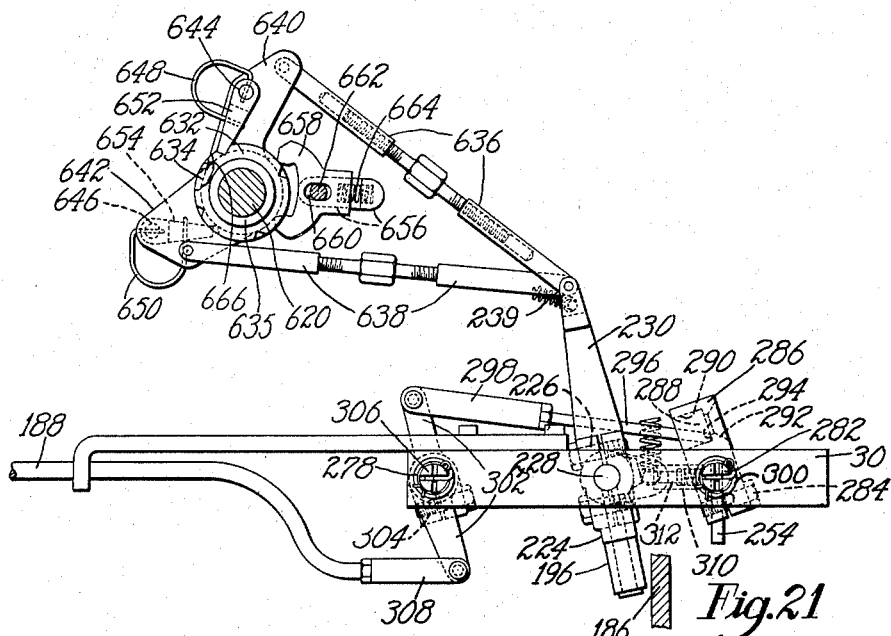
Figure 22:
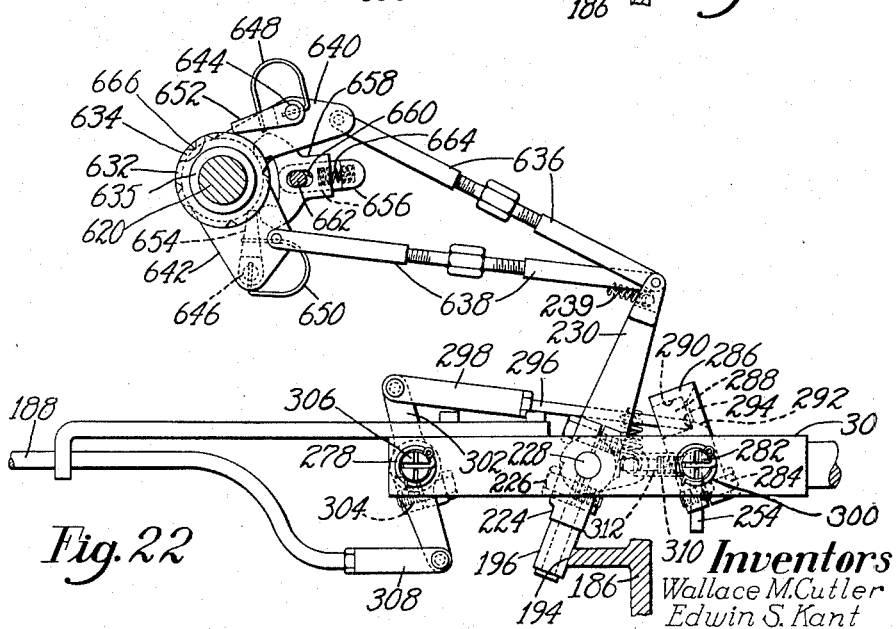

Fig. 20A shows another modified roll which can be used in place of the roll illustrated in Figs. 19 and 20; and Figs. 21 and 22 are views showing in side elevation mechanism for operating the modified nail roll illustrated in Figs. 18, 19 and 20 at two stages in the operation of said roll.

The illustrative nail distributor comprises a fixed base or main frame 30 which is secured by bolts 32 (Figs. 1, 2 and 3) to a horizontal bracket 34 (Fig. 1) forming part of a fixed frame (not shown) of a heel attaching machine such, for example, as disclosed in an application for United States Letters Patent Serial No. 281,392, filed April 9, 1952, in our names.

Figure 5:
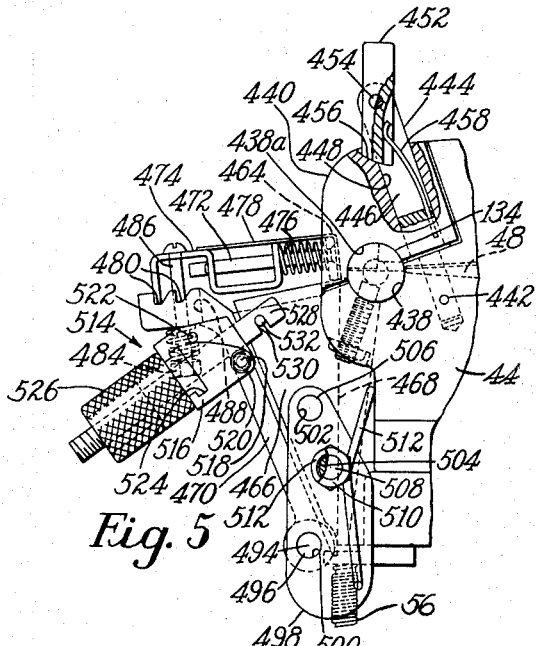
Fig. 5 is a view on line V—V of Fig. 4 showing in side elevation a front gate of a nail carrier of the distributor.
Figure 4:
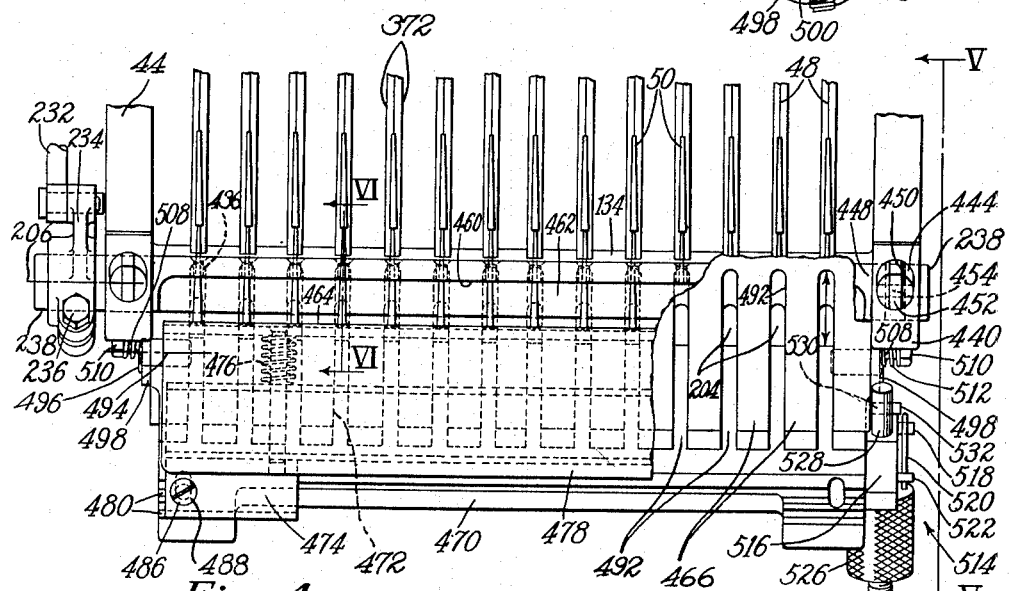
Fig. 4 is an enlarged view, partly broken away, showing in plan a front portion of the distributor.

Secured by bolts 36 (Figs. 1 and 3) to the base 30 of the distributor are front and rear pairs of vertically disposed leaf springs 38, 40, respectively, upper ends of which are secured by bolts 42 (Figs. 1 and 2) to a nail carrier 44. The carrier 44 comprises raceways 46 (Figs. 1, 2, 11, 15 and 16) and nailways 48 (Figs. 1, 2, 4, 5, 6, 15, 15A and 18), as well as other elements hereinafter described for delivering, in response to movement of nail loading mechanism of said heel attaching machine, nails 50 (Figs. 4, 6, 16 and 18) dumped from buckets 52 (Fig. 1) of a rotary nail drum 54, head first into tubes 56 (Figs. 1 and 5), upper ends of which are attached in slots 57 (Figs. 18 and 19) of the carrier and lower ends of which are attached to a foot plate (not shown) forming part of the heel attaching machine.

It is desired to vibrate or oscillate the carrier 44 to cause the nails 50 to travel down the raceways 46 and nailways 48. Accordingly, the machine is provided with mechanism, hereinafter described in detail, for vibrating the carrier upon the springs 38, 40 forward and rearward in a horizontal path without any substantial heightwise or widthwise component, the extent or amplitude of vibration of the carrier being varied in accordance with the length and construction of the nails being handled. As will be explained, in order to insure against any unbalanced forces being imparted to the carrier 44 and thus causing said carrier to vibrate out of its horizontal path, and especially heightwise, thereby losing control of nails in the raceways 46 and nailways 48, the mechanism for vibrating said carrier is dynamically balanced.

Power for operating the nail distributor is supplied by a constantly rotating motor (not shown) which is bolted to the bracket 34 and, through a V-belt 58 (Fig. 9), drives a pulley 60 (Figs. 1, 2, 3 and 9) secured by screws 62 to an outer half 64 of a two-part pulley 66; said outer half being secured by the screws 62 to an outer or hollow shaft 68 (Figs. 3 and 9) coupled by a pin 70 to a solid shaft 72; said shafts 68, 72 being rotatable in ball bearings 74, 75 respectively mounted in the base 30. Also secured to the hollow shaft 68 by screws 76 is an inner portion 78 of a pulley 80; inner and outer halves 82, 84 of the pulleys 66, 80 respectively having secured to them pins 86, 88 (Fig. 9) which fit slidingly in elongated slots 90, 92 formed in the hollow shaft and also fit slidingly in elongated slots 94, 96 formed in an inner shaft 98 (Figs. 3 and 9) longitudinally slidable in the hollow shaft 68. Mounted on the inner and outer halves 82, 84 of the pulleys 66, 80 respectively are inner races of ball bearings 100, 102 to outer races of which are secured belt-receiving drums 104, 106. The pins 86, 88 are engaged by opposite ends of a compressed spring 108 housed in the inner shaft 98, said spring constantly urging converging belt driving faces 110, 112 of the pulleys 66, 80 toward opposed belt driving faces of the respective pulleys. By sliding the inner shaft 98 to the right and to the left, from its position shown in Fig. 9 the pulleys 80, 66 respectively may be rendered ineffective. For reasons which will be explained later, when the pulley 66 is rendered ineffective an upper distributor (not shown) normally driven through a belt 114 (Figs. 2, 3 and 9) by the pulley 66 ceases to operate and when the pulley 80 is rendered ineffective the carrier 44 ceases to vibrate on the leaf springs 38, 40.

The inner shaft 98 is slid lengthwise of the outer shaft 68 by a yoke 116 (Figs. 3, 9 and 10) which is secured by a screw 117 to a fulcrum rod 118 journaled in the base 30, sides of the yoke having slots 120 in which fit trunnions 122 carried by an annulus 124 (Figs. 3 and 9) secured to an outer race of a ball bearing 126, an inner race of which is bindingly fixed to a sleeve 128 slidingly mounted upon the outer shaft 68. A pin 130 secured to the sleeve 128 and to the inner shaft 98 passes through elongated slots 132 (Fig. 9) in the outer shaft 68. It will thus be apparent that when the yoke 116 is swung counterclockwise as viewed in Fig. 9, the inner half 62 of the pulley 66 will be moved away from the outer half 64 of such pulley, thereby moving the driving face 110 of the pulley away from an opposed driving face of said pulley and rendering the belt 114 ineffective. Similarly, when the yoke 116 is swung clockwise from its position shown in Fig. 9 during the dumping of nails 50 from a nail roll 134, the outer half 84 of the pulley 80 is moved away from the inner half 78 of said pulley to render the pulley ineffective thus stopping rotation of a shaker shaft assembly 136, which will be described in detail later and is operated by a belt 138 driven by the pulley 80.

Arranged in alinement with the shaft 68 is the solid shaft 72 which has fixed to it a worm 140 (Figs. 1, 3 and 9) meshing with a worm gear 142 (Fig. 9) secured to a longitudinal shaft 144 (Figs. 3, 9 and 17) rotatable in bearings 146 (Figs. 1 and 3) in the base 30. Splined for rotation with but movable lengthwise of the shaft 144 are a pair of gears 148, 150 which are secured together and are rotated with but are slid lengthwise of the shaft 144 by a yoke-shaped shifter 152 fingers of which are arranged adjacent to opposite sides of the gears.

Figure 1:
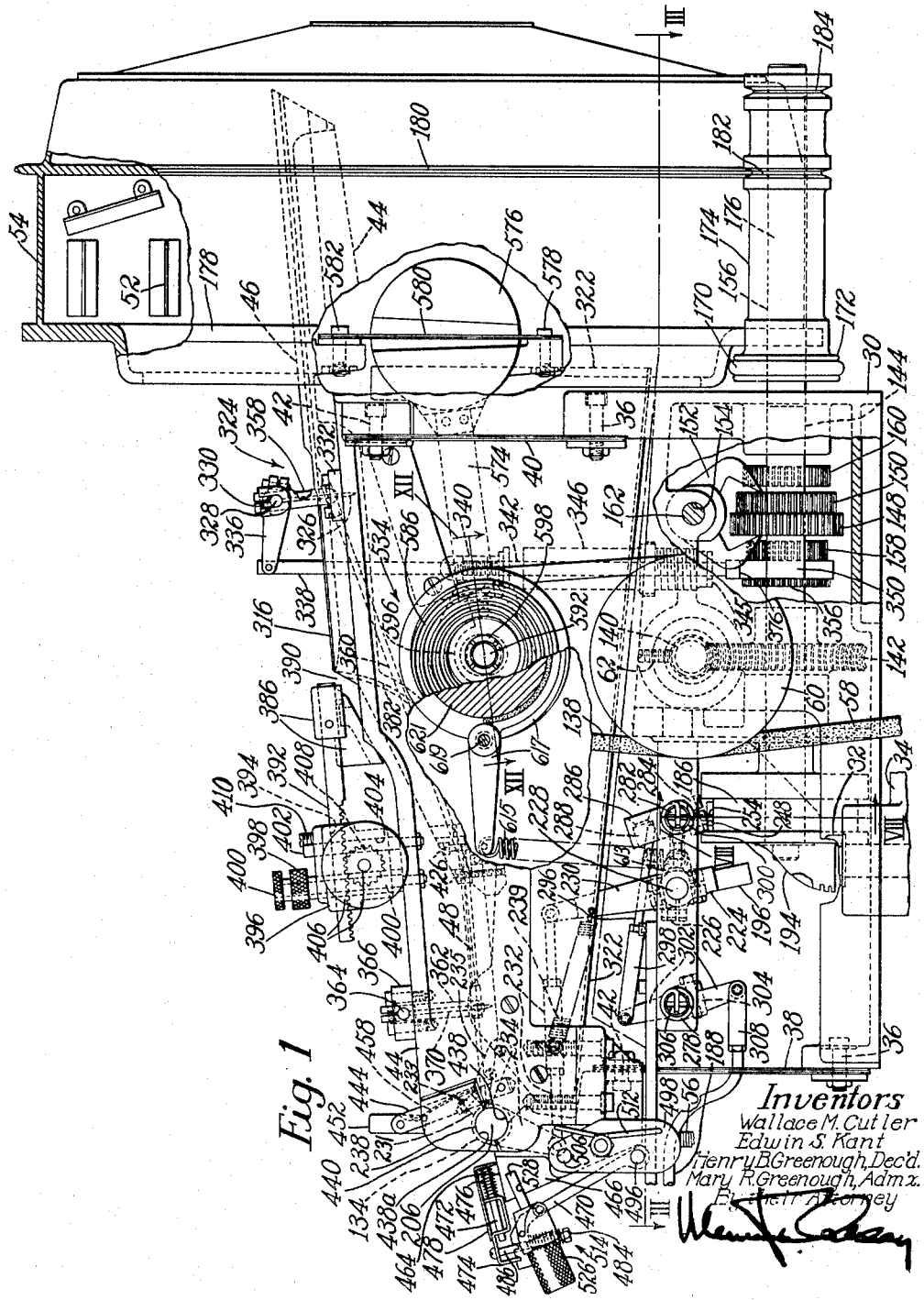
Figs. 1 and 2 are side and plan views respectively, partly broken away, showing the illustrative nail distributor.
Figure 2:
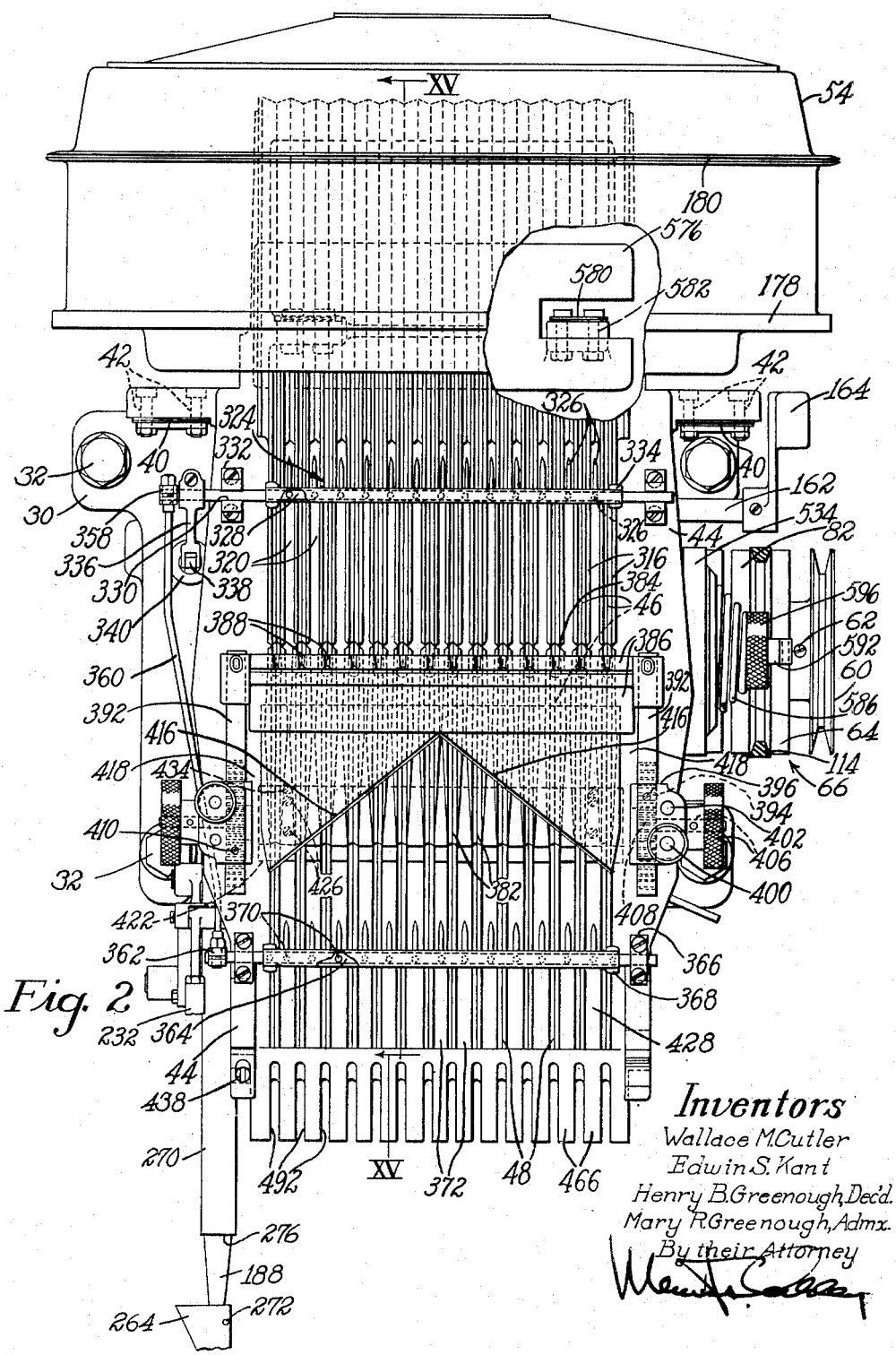
Figure 3:
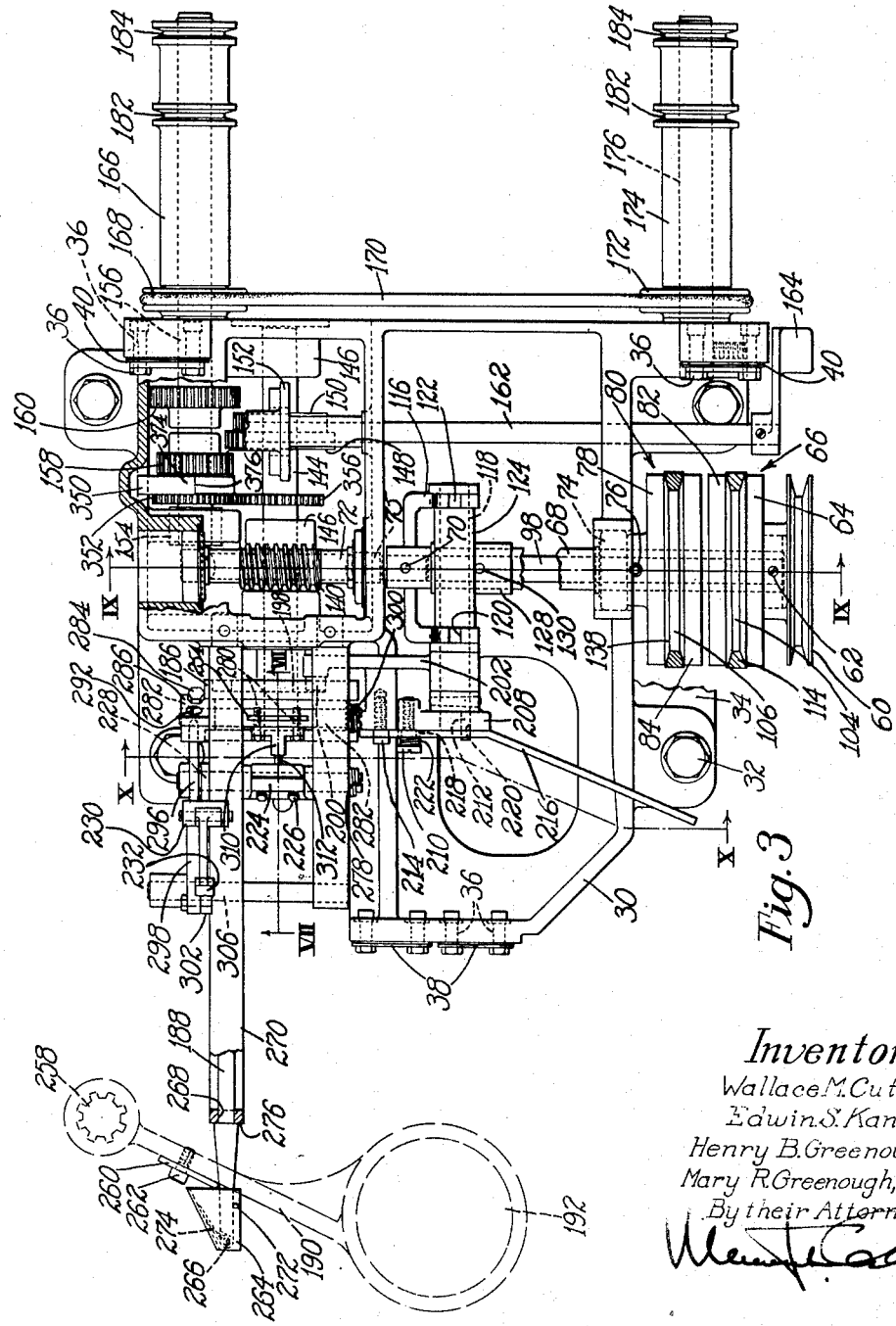
Fig. 3 is a plan view, partly broken away, on line III—III of Fig. 1, showing a base portion of the nail distributor and mechanism mounted thereon.

Mounted for rotation in bearings 154 in the base 30 is a longitudinal shaft 156 (Figs. 1, 3 and 17) to which are secured a pair of gears 158, 160 arranged in overlapping relation as viewed in plan (Fig. 3) with gears 148, 150 which, as above stated, may be slid lengthwise of the shaft 144 by the shifter 152 to move the gears 148, 150 into meshing relation with the gears 158, 160 respectively or, if desirable, to move the gears 148, 150 into neutral position shown in Figs. 1 and 3 out of engagement with either of the gears 158, 160. The shifter 152 is secured to an operating rod 162 (Figs. 1, 2 and 3) rotatable in bores in the base 30 and having at its outer end a handle 164 which may be swung one way or the other selectively by the operator to move the gears 148, 150 to the right or to the left (Figs. 1 and 3) on the shaft 144 in order to drive the shaft 156 and accordingly the nail drum 54 supported by mechanism, hereinafter described, at different operating speeds, or to move the gears 148, 150 to neutral positions out of engagement with the gears 158, 160 to stop rotation of the shaft 156 and accordingly the nail drum 54. Pinned to the shaft 156 is a nail drum supporting sleeve 166 (Fig. 3) formed integral with a pulley 168 which drives, through a belt 170 (Figs. 1 and 3), a pulley 172 formed integral with a nail drum supporting sleeve 174 mounted upon a bearing rod 176 secured to the base 30. The nail drum 54 is of a conventional type and has a cylindrical face 178 (Fig. 1) in engagement with bosses of the nail drum supporting sleeves 166, 174 and a circumferential rib 180 which fits in V-shaped circular grooves 182 of said sleeves. The sleeves 166, 174 are also provided with grooves 184 for supporting a different type of nail drum (not shown).

Mounted upon the forward end of the shaft 144 is a compound cam 186 (Figs. 1, 3, 7, 10, 21 and 22) which houses a one-revolution clutch, said clutch being operated during each cycle of the heel attaching machine in response to mechanism hereinafter described and comprising a rod 188 (Figs. 1, 2 and 3) operated by an arm 190 (Fig. 3) which supports a loader block 192 of said machine. The cam 186 has a front face 194 (Figs. 1, 7 and 10) a major portion of which is deeply serrated and which is engaged by a cam roll 196, and said cam has in its rear face a groove 198 (Figs. 3 and 10) in which fits a roll 200 of a lever 202 normally secured, by mechanism which will be described presently, to the yoke 116. The yoke 116, as above explained, cooperates with mechanism hereinafter described to cause the shaker shaft assembly 136 (Fig. 12) to be rendered ineffective and accordingly vibration of the carrier 44 to cease while the nail roll 134 is being operated, thereby insuring against nails being fed down the raceways 46 and nailways 48 while the nail roll is displaced from its nail receiving position shown in Fig. 6. In order to expedite the dumping of the nails from the roll 134 into conduits 204 (Figs. 4, 6 and 18) which will be referred to later, a major portion of the face 194 of the cam 186 is serrated as above stated so that the roll shall be vibrated slightly about its axis 206 (Figs. 1 and 4) as the nails are being dumped.

Pinned to the front end of the yoke carrying fulcrum rod 118 is a triangular plate 208 (Figs. 3 and 10) which carries a pair of studs 210, 212. Threaded into a forward extension of the lever 202 is a bearing stud 214 (Figs. 3 and 10) upon which is pivoted with a slight amount of play a hand lever 216 provided with an elongated slot 218 for receiving the stud 210 and a bore 220 for receiving the stud 212. A coil spring 222 which is interposed between the lever 216 and a head of the stud 214 serves to urge the lever against the plate 208. When the hand lever 216 is positioned as illustrated in Fig. 10 the lever 202 and the yoke 116 are secured for movement together, the lever 202 actuated by the cam 186 serving to move, through mechanism above described, the inner shaft 98 to the right from the position shown in Fig. 9 to render, during the operative cycle of the machine, the pulley 80 ineffective and thus to stop vibration of the carrier 44. When it is desired to render the pulley 66 ineffective and accordingly to stop an upper distributor (not shown) actuated by the belt 114 on said pulley the hand lever 216 is swung forward slightly, against the action of the spring 222, away from the plate 208 causing the bore 220 to become disengaged from the stud 212, said hand lever thereafter being swung clockwise as viewed in Fig. 10 upon the stud 214 with the result that the yoke 116 is swung counterclockwise and the inner shaft is slid to the left to render the pulley 66 ineffective. When it is desired to render ineffective the pulley 80 and accordingly the shaker shaft assembly 136, the hand lever 216 is swung away from the plate 208, causing the bore 220 to be disengaged from the stud 212, and is thereafter swung upward about the stud 214 causing the outer portion 84 of the pulley 80 to be moved away from the inner portion 78 of such pulley to render said pulley ineffective.

Figure 6:
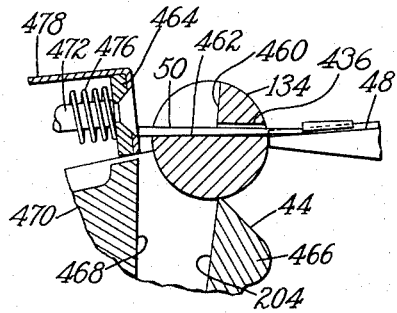
Fig. 6 is a section on line VI—VI of Fig. 4 showing a nail roll, a nail stop and conduit into which nails are dumped from said roll.
Figure 7:
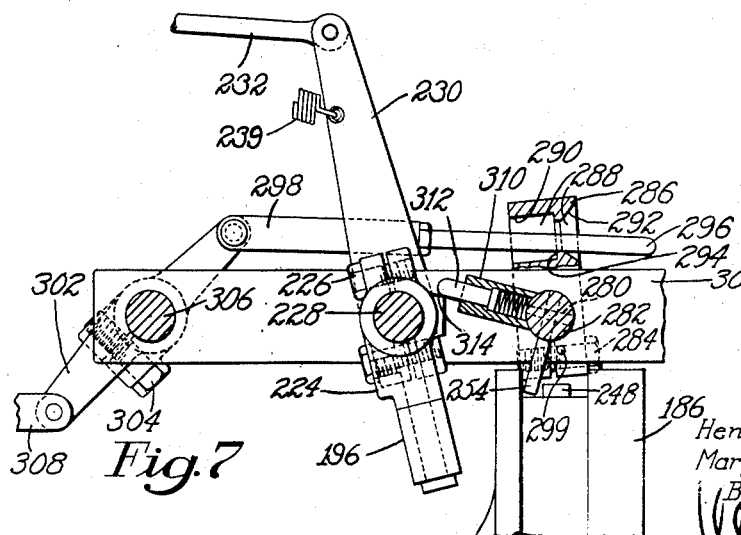
Fig. 7 is a section on line VII—VII of Fig. 3 showing cam actuated mechanism for operating the nail roll.

Mechanism for operating the nail roll 134 from its nail receiving to its nail dumping position comprises the cam roll 196 which is carried by a lever 224 (Figs. 1, 3, 7, 21 and 22) clamped by screws 226 to the central portion of a fulcrum pin 228 journaled in the base 30. Secured to the left end of the pin 228, as viewed from the front of the distributor is an upstanding lever 230 operatively connected through an adjustable link 232 (Figs. 1, 2, 3, 4 and 7) to an arm 234 secured by a bolt 236 (Fig. 4) to a left trunnion portion 238 of the nail roll 134. Attached to the upper end of the lever 230 is a spring 239 the forward end of which is secured to the carrier 44, said spring serving during a portion of the cycle of operation of the distributor to retain the cam roll 196 against the face 194 of the cam 186. Secured to the nail roll 134 is an arm 231 having threaded into it a screw 233 which when the nail roll is in its nail receiving position shown in Fig. 6 is held by the spring 239 in forced engagement with a stop plate 235 secured to the carrier 44.

Figure 8:
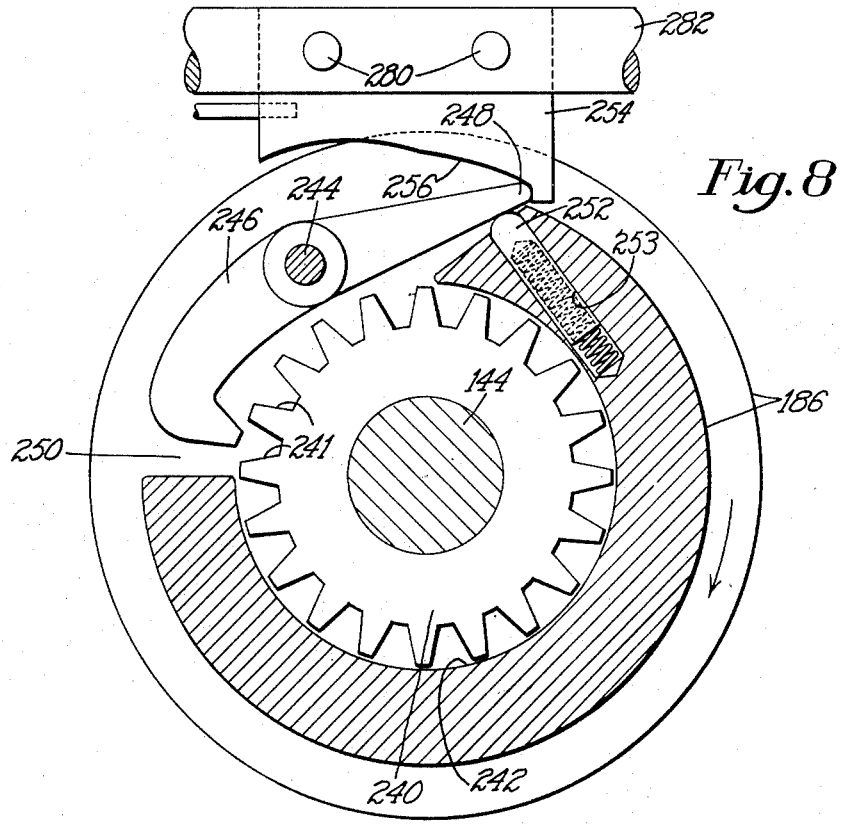
Fig. 8 is a section on line VIII—VIII of Fig. 1 showing in detail a one-revolution clutch housed in the nail roll operating cam shown in Fig. 7.

The cam 186 houses a one-revolution clutch which is actuated by mechanism hereinafter described upon movement of the loader block carrying arm 190 toward the above-mentioned nailing die (not shown) of the heel attaching machine. The clutch comprises a collar 240 (Fig. 8) which has a plurality of notches 241 and which is secured to the longitudinal shaft 144 (Figs. 3, 7 and 17) and fits in a cylindrical recess 242 of the cam. Pivotally mounted upon a pivot pin 244 carried by the cam 186 is a pawl 246 one end of which is adapted to enter one of the notches 241 of the collar and an abutment end 248 (Figs. 1, 7 and 8) of which extends through a slot 250 in the cam. The pawl 246 is constantly urged counterclockwise as viewed in Fig. 8 by a spring-pressed plunger 252 slidable in a bore 253 of the cam 186. The pawl 246 is normally urged to its idle position shown in Fig. 8 by a depressor 254 having a lower face 255 which is engaged by the abutment end 248 of the pawl to withdraw the pawl from one of the notches 241 when the clutch is engaged and the cam is being rotated by the shaft 144.

The loader block 192 is mounted upon the arm 190 which is vertically slidable upon an upright splined shaft 258 (Fig. 3) and which after being moved from a lowered nail receiving position adjacent to a nail tube holder (not shown) of the machine is raised to a predetermined position shown in dash lines (Fig. 3) on said shaft, the shaft 258 thereafter being rotated in a main frame of the heel attaching machine to effect swinging movement of the loader arm 190 and accordingly corresponding movement of the loader block 192 to a position above the nailing die (not shown) of the machine preparatory to dumping nails received from the nail tube holder (not shown) into passages of the nailing die. As the loader arm 190 moves clockwise as viewed in Fig. 3 with the shaft 258 (Fig. 3) a plate 260 secured by a screw 262 to the arm engages a U-shaped latch 264 (Figs. 2 and 3) mounted upon a fulcrum pin 266 supported by the rod 188 which is slidingly mounted in a bore 268 of a bracket 270 constituting part of the distributor base 30. A pin 272 carried by the latch 264 is normally forced into engagement with the rod 188 by an initially loaded spring 274 (Fig. 3) which encircles the pin 266 and bears with constant pressure against the inside of the latch. As the plate 260 swings clockwise as viewed in Fig. 3 it rides over and away from the latch 264, allowing the rod 188 to move back to its rest position shown in Fig. 3 with a shoulder of the arm bearing against a shoulder 276 of the bracket 270 under the action of a strong spring 278 which is operatively connected to the rod 188 and will be described in detail later. As the loader arm 190 swings counterclockwise back to its position (Fig. 3) preparatory to being lowered to a position adjacent to the nail tube holder (not shown) the plate 260 engages an outer inclined face of the latch which yields against the action of the spring 274, enabling the plate of the loader arm to override the latch, which then assumes its position shown in Fig. 3. The construction of the nail loading mechanism just described is disclosed in detail in the above-mentioned application Serial No. 281,392 and need not be further described herein.

The depressor 254 is secured by screws 280 (Fig. 3) to the central portion of a fulcrum rod 282 (Figs. 1, 3, 7, 21 and 22) which is supported for rotation in the base 30 and has clamped to it by a screw 284 a block 286. Extending forward and rearward through the upper portion of the block 286 is a recess 288 (Figs. 1, 7, 21 and 22) comprising cylindrical and frusto-conical portions 290, 292 the cylindrical portion having a shoulder 294. When the nail distributor is idle and during a major portion of its operation a rod 296 screwed into a link 298 extends into and engages the bottom of the cylindrical portion 290 of the recess 288 of the block 286, the rear end of the rod being arranged adjacent to the shoulder 294 as shown in Figs. 21 and 22. The fulcrum rod 282 and accordingly the block 286 and the depressor 254 are biased to their positions shown in Figs. 1, 21 and 22 in which the depressor 254 engages a stop 299, by an initially loaded tortion spring 300 opposite ends of which are attached to the rod and to the base 30. The link 298 is pivoted to the upper end of a lever 302 secured by a screw 304 to a pivot pin 306 mounted in the base 30, a lower end of said lever being pivoted to a link 308 into which the operating rod 188 is threaded, said rod as above explained being normally urged to the right as viewed in Figs. 1, 21 and 22 by the tortion spring 278 one end of which is attached to the pivot pin 306 and the other end of which is attached to the base 30. It will be apparent that when the rod 188 is moved to the left as viewed in Figs. 1, 3, 21 and 22 it will move the block 286 clockwise, causing the depressor 254 to swing away from the abutment end 248 of the pawl 246 with the result that the pawl acted on by the spring-pressed plunger 252 enters one of the recesses 241 of the collar 240 and locks the cam 186 for rotation with the collar 240 and accordingly the shaft 144. It will be apparent that the rod 296 after swinging the block 286 to its position shown in Fig. 7 slides off the shoulder 294 and plunges through the frusto-conical recess 292, said rod being immediately retracted to its starting position by the spring 278 into a position in which the end of the rod engages the bottom of the cylindrical recess 290 adjacent to its forward end.

In order to insure that the depressor 254 shall not immediately snap back against the abutment end 248 of the pawl 246 under the action of the spring 300 as soon as the rod 296 leaves the shoulder 294 of the block 286, the fulcrum rod 282 has secured to it by the screws 280 a forwardly extending boss 310 in which is slidable a spring-pressed plunger 312. When the block 286 is moved clockwise to its position shown in Fig. 7 the plunger 312 overrides a shoulder 314 of the lever 224, causing the depressor 254 to be held temporarily in its forward position out of the way of the abutment end 248 of the pawl 246. When the above-described mechanism for operating the nail roll 134 is actuated by the rotation of the cam 186 the shoulder 314 of the lever 224 is tipped downward with the result that the torsion spring 300 causes the spring pressed plunger 312 to be retracted against its spring and the depressor to be swung back to a retracted position against the stop 299. When the depressor 254 is thus positioned it is engaged by the abutment end 248 of the pawl 246 as the cam completes one revolution, thereby withdrawing the pawl from the collar recess 241 in which it engages, and causing the cam 186 to be released from the shaft 144 and to come to rest.

The carrier 44 is made of aluminum and comprises the raceways 46 onto plateau or elevated portions 316 of which the nails 50 are dumped from the buckets 52 of the nail drum 54. In order to advance the nails 50 down the slightly inclined plateau portions 316 (Figs. 1, 2, 15 and 16) of the raceways 46, the carrier 44 is vibrated at a speed of approximately 1300 cycles per minute, the foreward and rearward displacement or vibratory amplitude of the carrier on the springs 38, 40 being varied by changing the throw of a compound eccentric 318 (Fig. 12). The nails 50 slide down the plateau portions 316 of the raceways 44 head or point ends leading, many of the nails lying crosswise of the raceways. In order to cause nails lying crosswise of the plateau portions 316 of the raceways 46 to be moved into said raceways or into recesses 320 (Fig. 2) which are formed between said plateau portions and through which the nails drop into a collecting pan 322 (Fig. 1) and back into the drum 54, there is provided a raceway clearer 324 (Figs. 1, 2 and 15) comprising a plurality of downwardly tapering prongs 326, the upper ends of which are held in converging openings in a bar 328 rotatably supported in slots 330 of blocks 332 secured by screws to the carrier 44. The prongs 326 are held in the bar 328 by a retaining member 334 which is fixed to the bar and engages the upper ends of the prongs, the lower ends of said prongs extending into the recesses 320 between the raceways 46.

The prongs 326 of the clearer 324 are constantly swung lengthwise of the recesses 320 so long as the pulley 60 is rotated, thereby forcing nails straddling the plateau portions 316 of the raceways 46 into said raceways or knocking said nails through said recesses into the pan 322 as above explained. The clearer bar 328 has secured to its left end as viewed from the front of the machine an arm 336, the forward end of which is pivoted to a link 338 pivoted at its lower end to a coupling 340 (Figs. 1 and 2) having threaded into it a rod 342 (Figs. 1 and 17) slidable in a bore 344 (Fig. 17) of a screw 345 threaded into the lower end of a housing 346 which is threaded into the base 30. The lower end of the rod 342 is forced by a spring 348 against a cam 350 (Figs. 1, 3 and 17) which is pinned to a gear 352 rotatable upon the longitudinal shaft 156, a lower end of said spring engaging a pin 354 (Fig. 17) secured to the rod and the upper end of the spring engaging a shoulder of the housing. The gear 352 is rotated continuously so long as the pulley 60 is rotating, by a gear 356 which is fixed to the shaft 144. Such continuous operation of the raceway clearer 324 is desirable in order that after stopping the nail drum 54 by moving the shift lever 162 to neutral position preparatory to changing nails, surplus nails on the raceways 46 may be knocked through the recesses 320 (Fig. 2) into the pan 322 (Fig. 1) and the nails in the raceways will be fed to the nailways 48 where they will be knocked by the operator into the pan 322, as will be explained later.

Secured to the left end of the clearer bar 328 as viewed from the front of the distributor is a depending arm 358 (Figs. 1, 2 and 15) which is operatively connected by a link 360 to a depending arm 362 secured to the left end of a clearer bar 364 rotatably mounted in bearing blocks 366 secured by screws to the carrier 30. Held in bores of the clearer bar by a retaining clip 368 (Figs. 2 and 15) are a plurality of tapered prongs 370 extending into recesses 372 between the nailways 48.

As the cam 350 rotates counterclockwise as viewed in Fig. 17 the prongs 326, 370 swing slowly forward as the face 374 of the cam travels past the end of the rod 342. As the rod 342 drops over a shoulder 376 of the cam 350 it is forced downward suddenly under the action of the spring 348 against the face 374 causing the prongs 326, 370 to be swung rearward suddenly, with the result that the nails lying across the plateau portions 316 of the raceways 46 and across the nailways 48 are knocked into the raceways or nailways or into the recesses 320, 372 of the carrier 30 back into the pan 322 where they are returned to the nail drum 54.

Any of the raceways 44 not desired to be used may be closed by positioning over them stops or clips 378 (Figs. 15 and 15B) which are sprung into place over the raceways 46 and have abutment or deflecting portions 380 which are engaged by leading nails sliding down the raceways. The stops or clips 378 are claimed in United States Letters Patent No. 2,575,336, granted November 20, 1951 in the name of Edwin C. Eldred, Jr.

The raceways 46 comprise arcuate sluice portions 382 (Figs. 1, 2, 15, 15A and 16) which curve downwardly from corners 384 formed by the sluice portions with the plateau portions 316 of the raceways. Arranged opposite the corners 384 of the raceways 46 is a balancing bar 386 having nail receiving slots 388 which are spaced by a gap 390 (Figs. 1, 15 and 16) from and are in alinement with the plateau portions 316 of the raceways. It is desirable that the nails move head ends first in succession down the sluice portions 382 of the raceways 46 and down the nailways 48 and in order to reverse nails which slide point ends first off the plateau portions 316 of the raceways the balancing bar 386, is so spaced from the plateau portions of the raceways that should the nails slide head ends first over the corners 384 of the plateau portions they will drop head ends first down the sluice portions 382 of the raceways. Whenever nails move point ends first down the plateau portions 316 of the raceways 46 they bridge the gap 390 and slide into the alined slots 388 of the balancing bar 386 and as the nails thus traveling continue to move down the carrier 30 and leave the plateau portions 316 of the raceways 46 they drop backward head-ends first, down the sluice portions of the raceway as indicated in dotted lines (Fig. 16).

The balancing bar 386 (Figs. 1, 2, 15 and 16) has secured to its opposite sides racks 392 which are slidingly mounted in guideways 394 of mounts 396 threaded onto screws 398 (Figs. 1 and 15) rotatably mounted on bearing pins 400 secured to the carrier 44, guide pins 402 secured to the carrier and arranged parallel to the bearing pins fitting slidingly in bores 404 of the blocks. Rotatably mounted in each of the blocks 396 is a hand operated shaft 406 having fixed to it a pinion 408 meshing with an associated rack 392. It will thus be apparent that the balancing bar 386 may be adjusted lengthwise of the machine by rotating the shaft 406 and may be raised or lowered by rotating the screws 398, the racks 392 being secured in their adjusted positions to the blocks 396 by set screws 410 which are threaded into the blocks and are constructed and arranged to have their ends forced into engagement with the racks.

In order to insure against short nails somersaulting just after they travel head-ends first over the corners or edges 384 of the raceways 46 the balancing bar 386 has secured to it an abutment 414 which extends downward toward the sluice portions 382 of the raceways 46 and then along in spaced relation with said sluice portions.

It sometimes happens that the nails after sliding into the nail receiving slots 388 (Figs. 2, 15 and 16) of the balancing bar 386 do not tip backward head-ends first into the sluice portions 382 of the raceways 46 as above described. In order to guide such nails, which slide along the nail receiving slots 388 and off the forward ends of the balancing bar 386, back into the nail drum 54 there is secured to the balancing bar and arranged overlying the sluice portions 382 of the raceways 46 an apron 416 (Figs. 2 and 15) which deflects the above-mentioned nails laterally and downwardly into recesses 418 (Fig. 2) at the lateral portions of the carrier 44.

The plateau and sluice portions 316, 382 of the raceways 46 are formed integral and are also formed integral with the main body of the carrier 44. Since the nailways 48 are changed in accordance with the style and any substantial change in the length of the nail, said nailways are formed separately from the carrier 44 and are readily secured in operating positions in the carrier. The nailways 48 have rearward extensions 420 (Figs. 15 and 15A) fitting in slots 422 (Fig. 15A) of a header 424 secured to a rabbeted lower end of the sluice portions 382 of the raceways 46 by screws 426 which pass through partitions 428 of the raceways and into the header. Before being placed in the carrier 44 the nailways 48 are assembled in the slots 422 of the header 424 and are secured in said slots by nuts threaded onto L-shaped retaining studs 432 which are inserted in lateral bores of the nailways and pass through vertical bores in the header. Threaded into two or more of the partitions 428 are screws 434 which bear upon the top of the nailway extensions 420, said screws serving to bring the forward ends of the nailways 48 up into alinement with passages or guideways 436 of the nail roll 134. In incorporating nailways 48 in the carrier 44 the forward pair of screws 426 are tightened after which the screws 434 are adjusted to move the forward ends of the nailways up into alinement with the nail roll passages 436. The rear pair of screws 426 are then tightened to clamp the nailways 48 in their adjusted operating positions. The nailways 48 may be considered part of the raceways 46 but are identified separately in the description since they are not formed integral with the carrier and their construction is slightly different from that of the raceways. Both the raceways 46 and the nailways 48 may be considered as nail guides and described as such.

The trunnion portions 238 of the nail roll 134 which may also be referred to as a selector are mounted for rocking movement in bores 438, 438A (Figs. 1, 2 and 5) which are formed in the carrier 44 and in bearing blocks 440 detachably secured to the carrier. Secured by screws 442 (Fig. 5) to the carrier are latches 444 (Figs. 1, 4 and 5) having cylindrical shanks 446 (Fig. 5) slidable in bores 448 formed in the bearing blocks 440. The upper end of the shank 446 of each of the latches has a slot 450 (Fig. 4) for receiving a detent 452 (Figs. 1, 4 and 5) pivotally mounted upon a pin 454 secured to said shank. When the blocks 440 have been placed in their proper operating positions over the shanks 446 of the latches 444 the detents 452 are swung into slots 456 (Fig. 5) formed in the blocks with the lower faces of the detents in engagement with the bottoms of the slots. The detents 452 are constantly urged clockwise as viewed in Fig. 5 into the slots 456 by springs 458, respectively, the lower ends of which are secured to the shanks 446 and the upper ends of which engage the detents. The nail roll 134 may be quickly and effectively positioned in the carrier 44 after removing the bearing blocks 440 which are thereafter slid down over the shanks 446 of the latches 444 against the trunnion portions 238 of said roll, the detents 452 then being arranged to enter the slots 456 in the blocks to hold said blocks in their operating positions. After the nail roll 134 has been properly journalled in the carrier 44 which may be said to include the blocks 440, the link 232 pivoted to the arm 234 secured to the left trunnion portion 238 of the roll is adjusted to position the nail passages 436 of the roll 134 in alinement with the lower ends of the nailways 48.

When short nails are being distributed the conventional type of roll 134 is used, said roll having the transverse passages 436 (Figs. 4, 6 and 15) which extend from the rear cylindrical periphery of the roll to a segmental cutout portion defined by a face 460 in which the passages terminate and a face 462 which is continuous with the lower faces of the passages. Secured to the left trunnion portion 238 of the roll 134, as viewed from the front of the machine, is the arm 234 which is operatively connected to the roll 196. When the cam 186 is rotated clockwise as viewed from the front of the distributor, the nail roll 134, in the passages 436 of which the nails rest with their head-ends in engagement with a nail stop 464 (Figs. 1, 4, 5, 6 and 18), is rotated counterclockwise (Fig. 6) causing the nails to be dumped into the conduits 204 which are formed by front slotted portions 466 of the carrier and rear faces 468 of projecting ribs or flanges of a front gate 470. The carrier 44 and the front gate 470 may be described as having interfitting slot and tongue portions. The nail stop 464 is secured at its opposite ends to rods 472 which are slidingly mounted in bores of holders 474 and are normally urged rearward, that is, to the right as viewed in Figs. 1, 5 and 18, by springs 476. The nail stop 464 is formed integral with a plate 478 covering the upper end of the front gate 470. The holders 474 have downwardly turned flanges fitting in front or rear pairs of grooves 480 formed at opposite ends of the front gate 470, the nail stop being commonly forced yieldingly against upper faces of the front slotted portion 466 of the carrier 44 by springs 482 which are interposed between the front gate and nuts 484 threaded onto bolts 486 passing through elongated recesses 488 in the front gate and secured to the holders 474. The illustrated nail stop 464 is set for handling relatively long nails but may be moved to a rearward position with relation to the nail roll 134 by lifting the holders 474 against the action of the springs 482 and positioning the downwardly extending flanges of the holders into the rear grooves 480. This will enable the distributor to handle short nails which may be only slightly longer than the length of the passages 436 of the nail roll 134, the nail stop 464 thus positioned resting upon the face 462 of the nail roll and during the nail dumping operation yielding forwardly against the action of the springs 476 under pressure applied by the face 460 of the roll against the nail stop as said roll rotates counterclockwise (Fig. 6) to dump the nails into the conduits 468.

As will be explained presently, the front gate 470 is pivotally adjusted with relation to the carrier 44 in accordance with the lengths of the nails being distributed to vary the lengthwise cross-sectional dimension indicated by reference numeral 490 (see Fig. 18) of the conduits 204 to insure against nails somersaulting in said conduits and in order to vary the space between the nail stop 464 and the nail roll 134. The conduits 204 which are formed by the slots 492 at the front portion of the carrier and the rear faces 468 of rearwardly projecting flanges or ribs of the front gate 470 have downwardly converging upwardly diverging front and rear faces the width of the conduits remaining constant.

It has been found that if the dimension 490 of the conduit 204 is somewhat greater than the length of the nail there is a tendency for said nail to somersault in the conduit and accordingly fall wrong end foremost, that is, point end down into the tube 56. With the foregoing in view, the front gate 470 is movable forward and rearward into different angularly adjusted positions about an axis 494 (Figs. 4, 5 and 18) of trunnions 496 formed integral with said gate, in accordance with the length of the nails being handled, the nail stop 464 being adjusted with the gate. The axis 494 may be described as extending generally lengthwise of the nail roll 134 and as arranged in the vicinity of the lower end of the conduit 204.

The front gate 470 is supported by a pair of brackets 498 mounted upon the front end of the carrier 44 and having bores 500 (Figs. 5 and 18) for receiving the trunnions 496 of said gate. The brackets 498 are also provided with bores 502, 504 which slidingly fit onto pins 506 and screws 508 (Fig. 5) secured to the carrier, the screws 508 having threaded onto their outer ends nuts 510. Coiled around the screws 508 and surrounding the screws and interposed between the plates 498 and the nuts 510 are portions of springs 512 opposite laterally extending ends of which engage the plates and the carrier and serve to force the plates against flat vertical surfaces of the carrier. The front gate 470 can be quickly removed from the carrier by manually moving the brackets 498 laterally outward against the action of the springs 512 to cause withdrawal of the bores 500 of the brackets from the trunnions 496.

A latch 514 (Figs. 1, 4 and 5) is provided for adjustably securing the front gate 470 in different adjusted positions about the axis 494 of the trunnions 496. The latch 514 comprises a block 516 pivoted upon a pin 518 carried by the front gate 470 and constantly urged upward about said pin by a torsion spring 520 a portion of which is attached to the pin and another portion of which bears against the under part of a stud 522 carried by the block. Rotatably mounted in an undercut recess 524 of the block 516 is a knurled nut 526, said nut and block having alined bores for receiving a rod 528, the front portion of which is threaded into the nut and the rear end of which has a slot 530 for receiving a pin 532 secured to the carrier 44. The front gate 470 may be lowered away from the carrier 44 after raising the rod 528 away from the pin 532 and the angularly adjusted position of the front gate upon the carrier may be varied by rotating the nuts 526.

Power for vibrating the carrier 44 is supplied by the belt 138 which operates a pulley 534 (Figs. 1, 2 and 12) forming part of the shaker shaft assembly 136. An inner portion 536 (Fig. 12) of the pulley 534 is keyed to a hollow shaft or sleeve 538 which is rotatable in ball bearings 540 mounted in the carrier 44 and which has an eccentric portion 542 provided with grooves 544 for receiving tongues 546 of an eccentric portion 548 of a shaft 550 rotatable in bearings 552 of the carrier 44. The hollow shaft or sleeve 538 and the shaft 550 are rotatable about a common axis 554 (Figs. 12, 13 and 14) and form in effect a single shaft and have eccentric portions 556, 558 respectively which are offset axially from the eccentric portions 542, 548. Each of the eccentric portions 556, 558 is of the same size as, and is offset circumferentially of the shaft 180° from, the adjacent half of the combined eccentric portions 542, 548. It will thus be clear that the combined shaft 538, 550 itself is dynamically balanced.

Mounted upon the eccentric portions 556, 558 are counterweights 560 which, as will be explained later, serve dynamically to balance the drive shaft assembly 136. The periphery of the eccentric portions 542, 548 is centered about a line 562 (Figs. 13 and 14A) parallel to the axis 554 and has adjustably mounted on it an eccentric 564 (Figs. 12 and 13) which is centered about a line 566 parallel to the axis 554 and which has mounted on it an inner race 568 (Fig. 12) of a ball bearing 570. Secured to an outer race 572 of the ball bearing 570 is a connecting rod 574 riveted to a heavy resisting or reacting weight 576 (Figs. 1, 2 and 11) secured by bolts 578 to the lower ends of leaf springs 580 (Figs. 1 and 11) upper ends of which are secured by bolts 582 (Figs. 2 and 11) to the carrier 44. The leaf springs 38, 40 and 580 may be described as having sides which face generally lengthwise of the nail guides and of the path of vibration of the carrier.

An outer portion of the pulley 534 carries a plurality of guide pins 584 (Fig. 12) which extend transversely through the inner portion 536 of the pulley, the outer portion of said pulley being urged constantly toward the inner portion of the pulley by a spring 586 (Figs. 1, 2 and 12) to close a belt receiving groove 588 (Fig. 12).

Fitting in a bore 590 of the sleeve 538, which bore is concentric with the axis of rotation 554 is an adjusting rod 592 which may be rotated into different adjusted positions about said axis by the use of a suitable tool fitting in a transverse hole 594 (Fig. 12) in the outer end portion of the rod. The rod 592 is secured in different adjusted positions in the sleeve 538 by a nut 596 (Figs. 1, 2 and 12) which is threaded onto a split tapered part 598 of the inner portion of the pulley 534. As above explained, in order to vary the throw of the connecting rod 574 the eccentric 564 is adjusted about the eccentric portions 542, 548, maximum eccentricity of the combined eccentric 318 being effective when the eccentric 564 is positioned as illustrated in Fig. 13. In order to move the eccentric 564 into different adjusted positions on the eccentric portions 542, 548 of the shaft 538, 550 the rod 592 has formed in it two bores 600 (Figs. 12 and 13) and in said bores are secured pins 602 which extend through arcuate slots 604 in the eccentric portions 542, 548 and have their ends extending into bores 606 (Fig. 13) formed in the eccentric 564. It will thus be apparent that when the rod 592 is rotated clockwise as viewed in Figs. 13 and 14 with relation to the shaft 538, 550 the pins 602 will move along the arcuate slots 604 of the eccentric portions 542, 548 and rotate the eccentric 564 upon said eccentric portions. After angularly adjusting the rod 592 with relation to the shaft 538, 550 it is secured in adjusted position by screwing the nut 596 onto the tapered extensions 598 of the inner portion 536 of the pulley 534 thereby clamping said extensions to said rod and thus locking together for rotation the shaft 538, 550, the pulley and the rod.

As the eccentric 564 is rotated at a constant speed of 1300 R. P. M. about the axis of rotation 554 of the shaft 538, 550 the carrier 44 is displaced substantially horizontally. The inertia ratio of the weight 576 and the carrier 44 is such that the weight has three times the displacement of the carrier, the maximum displacement of said carrier being approximately ⅛ of an inch. The inertia ratio of the carrier 44 and the weight 576 may be varied if desirable by increasing or decreasing the mass of said weight 576. It will be apparent that the displacement of the carrier 44 may be reduced from ⅛ of an inch by adjusting the outer eccentric 564 as above described.

By operating the shaker shaft assembly 136 at 1300 R. P. M. as compared with 750 R. P. M. as in the distributors now in use, the progress of the nails down the raceways 46 and the nailways 48 is substantially continuous and smooth. It is desirable to vary the magnitude of the vibratory displacement of the carrier 44 in accordance with the length of the nail being distributed, the desirable displacement being less than the distance between the centers of length and gravity of the nail, thereby insuring that the nails shall tip slowly and progressively head ends first from the plateau portions 316 of the raceway into the sluice portions 362 of the raceway. It is also desirable to insure against any heightwise displacement of the carrier 44 since such displacement tends to bounce the nails in the raceways 46 and nailways 48 and interferes with the progressive movement of the nails to the nail roll 134. Moreover it is desirable to insure that the carrier 44 shall have a minimum of side sway as it is vibrated and accordingly the weight of the carrier is so distributed that its center of mass lies in a vertical plane which is approximately equidistant between the pairs of springs 38, 40. In order to counterbalance the shaker shaft assembly 136 there are provided the abovementioned counterweights 560 which are mounted upon the eccentric portions 556, 558 of the shaft 538, 550 and are automatically rotated into different operating positions upon said eccentric portions simultaneously with adjustments to change the throw of the eccentric 542, 548. For the purpose of rotating the counterweights the adjusting shaft 592 has secured to it a pair of pins 610 (Figs. 12 and 14) which fit in arcuate slots 612 of the eccentric portions 556, 558 and into bores 614 of the counterweights. It will be apparent that when the adjusting shaft 592 is rotated clockwise as viewed in Fig. 13 in the shaft 538, 550 as above described, it will rotate the eccentric 564 upon the eccentric portions 542, 548. The variable displacement drive above described comprises mechanism for rotating the eccentric 564 into different angularly adjusted positions upon the eccentric portions 542, 548 of the shaft 538, 550 to vary the throw of the connecting rod 574 and for simultaneously rotating, degree for degree with the eccentric, the counterweights 560 about the eccentric portions 556, 558 of said shaft, thereby maintaining the shaker shaft assembly 136 in dynamic balance for all adjustments of the eccentric.

When the eccentric 564 is angularly adjusted about the center line 562 of the eccentric portions 542, 548 to its position shown in Fig. 13, the connecting rod 574 has its greatest throw of about ⅜ of an inch. In the illustrative construction the center line 562 is arranged midway between the center line 566 of the eccentric 564 and the axis 554 of the shaft 538, 550. The eccentric 564 is so constructed and arranged that its center of mass is located on the axis 566 which is equidistant from surface portions of the eccentric 564 upon which the inner races 568 of the ball bearings 570 are mounted. It will thus be clear that when the eccentric 564 is rotated clockwise 180° from its position shown in Fig. 13 upon the eccentric portions 542, 548 by the above described mechanism the locus or path of a point on the center line 566 where the mass of the eccentric plus an adjacent half of the connecting rod is concentrated is a semicircle 603 terminating at the axis 554. It will be apparent that when the said point on the center line 566 coincides with the axis 554 the connecting rod has no throw.

When the eccentric 564 is positioned as illustrated in Fig. 13 the counterweights 560, which may be considered collectively as a two-part counterweight and will be referred to as such, are positioned upon their associated eccentric portions 556, 558 as illustrated in Fig. 14. When the parts are thus positioned a center line 605 through the eccentric portions 556, 558 of the shaft 538, 550 lies in a plane which includes the axis 554 and the center lines 562 and 566 and is also parallel to said axis and is positioned the same distance at one side of said axis as the center line 562 is positioned at the opposite side of said axis.

The two-part counterweight has a mass equal to that of the eccentric 564 plus the mass of an adjacent half of the connecting rod, including its bearing, said counterweight being so constructed and arranged that its center of mass lies in a line 607 (Fig. 14A), parallel to the axis 554 in a plane which includes the axis 554 and the center lines 566, 562 and 605, the center lines 566 and 607 being equally spaced at opposite sides of the axis 554. Moreover, the center of mass also lies in a plane disposed at right angles to the axis 554 and including the center of mass of the eccentric 564 and the adjacent half of the connecting rod 574. It will, therefore, be clear that if the counterweights 560 are rotated clockwise on their respective eccentrics 556, 558 from their positions illustrated in Fig. 14 the locus or path of a point on a line 607, which passes through the center of mass of the two-part counterweight and is parallel to the axis 554, is a semicircle 609 (Fig. 14A), the inner end of which coincides with the axis 554. It will thus be clear, when a line 611 indicating the angle alpha of adjustment of the eccentric 564 and the two-part counterbalance about their respective eccentric portions is drawn through the axis 554 intersecting the semicircles 603 and 609, which represent the loci of the centers of unbalanced mass of the eccentric 564 and an adjacent half of its connecting rod on the one hand and the two-part counterweight on the other hand, that said centers of mass are equidistant from the axis 554 irrespective of the angle of adjustment and, since the masses are equal, the two unbalanced masses will counterbalance each other, thereby insuring that the shaker shaft assembly 136 is at all times counterbalanced.

The variable displacement drive and the mechanism for dynamically balancing said drive forms the subject-matter of United States Letters Patent No. 2,561,344, granted July 24, 1951, on an application filed in our names.

When the pulley belt 138 (Figs. 1, 3, 9 and 12) is rendered ineffective upon actuation of the nail roll driving mechanism above described, there is a tendency for the shaker shaft assembly 136 to continue to rotate. Accordingly, there is secured to the outer end of the fulcrum pin 228 (Fig. 1) an arm 613 which is connected by a spring 615 to a brake lever 617 which is pivoted upon a pin 619 secured to the carrier. During the first part of the clockwise (Fig. 1) nail roll dumping movement of the pivot pin 228 the brake lever 617 is moved counterclockwise against a drum 621 secured to the shaft 550, thereby stopping rotation of said shaft as soon as the belt has become inactive.

Nail distributors heretofore proposed have not been able to "handle" nails longer than 22/8, one of the difficulties being that such nails cannot be vibrated down the raceways and effectively dumped into the conduits fast enough to keep up with the operation of the machine being served. By making the carrier 44 smooth and even phased in its operation, together with increasing considerably the rate of vibration of said carrier, longer nails can be handled by the present distributor than by prior distributors.

Shoe manufacturers have recently been called upon to attach to shoes heels which require nails 28/8 inches in length. When nails of such length are used it is desirable to modify the present machine as will be hereinafter described. Extremely high heels are commonly attached to shoes by seven nails and since the illustrated carrier 44 has fourteen raceways 46 and nailways 48 it is proposed to "pick" nails alternately from adjacent nailways and to cause them to drop into adjacent conduits 204 (Figs. 4, 6 and 18) connected to branches 616 (Figs. 18 and 19) of tubes 618 (Fig. 19) which are secured at their lower ends to the above-mentioned foot plate (not shown). With such a construction it will be apparent that since the nails are removed from a given group of seven of the nailways 48 only during every other cycle of operation of the heel attaching machine they will have ample time to slide down the raceways 46 and nailways 48 into positions to be transferred to the conduits 204 by the nail roll. When extremely long nails are being distributed the nail roll 134 may have substituted for it a cylindrical nail roll 620, the bearing blocks 440 being quickly removed from the carrier 44 preparatory to removing the roll 134 and substituting for it said cylindrical roll. In effecting this changeover it also is necessary, after placing the bearing blocks 440 in position upon the carrier 44, to attach, to a left trunnion portion 622 (Fig. 19) of the nail roll, operating mechanism illustrated in Figs. 18, 19, 19A, 20 and 21.

The cylindrical nail roll 620 has extending through it at equal distances from planes 624, 626 (Fig. 20) which are disposed at right angles to each other and extend through an axis of rotation 628 of the roll, two longitudinal series of pairs of nail passages 630 (Figs. 18, 19 and 20). The pairs of passages 630 of one longitudinal series are disposed at right angles to and are alternately staggered longitudinally and circumferentially with relation to the pairs of passages of the other longitudinal series. Nails delivered by alternate nailways 48 are received head ends first as illustrated in Fig. 18 by the rear ends of the passages 630 which correspond to the passages 436 of the roll 134, said passages 630, when receiving nails, being positioned just above the axis of rotation 628 of the roll and being inclined at the same angle, approximately 5°, as the nailways 48.

Instead of oscillating or rocking the nail roll 620 as in the case of the roll 134 above described, the roll 620 is rotated 90° in two stages during each cycle of the heel attaching machine being served by the distributor. The lever 230 (Figs. 1, 3, 7, 21 and 22) which is actuated by the shaft 228, has operatively connected to its upper end mechanism which will be presently described and cooperates with spaced ratchets 632, 634 secured to a collar 635 keyed to the roll 620, the arrangement being such that the roll is rotated about its axis 628 (Figs. 19 and 20) counterclockwise as viewed in Fig. 18 approximately 75° to cause the nails which are in the passages 630 and have their ends in engagement with the nail stop 464 (Figs. 1, 4, 5, 6 and 18) to be dumped into the conduits 204. After a slight dwell in the dumping position the roll 620 again moves 15° counterclockwise, bringing upper passages 630, of the longitudinally and circumferentially offset pairs of passages arranged at right angles to the passages from which the nails have been dumped, into alinement with nailways 48 adjacent to the nailways 48 which supplied the prior load of nails.

As above explained, adjacent conduits 204 which may be considered as portions of the branches 616 of the tubes 618 are connected to said tubes, each of said tubes receiving in succession nails, first from one and then from the other of adjacent nailways 48. Since the illustrated distributor has fourteen raceways 46 and nailways 48 it will be apparent that each time the associated heel attaching machine is operated seven nails are dropped through the seven tubes 618. This number can be increased if desirable by placing a similar distributor above the illustrated distributor, such additional distributor being operated by the belt 114 to drive a pulley similar to the pulley 80.

In the illustrated machine the angle at which the nailways 48 are inclined to the horizontal is about 5° as compared with an angle of 15° which is the angle at which the nailways of distributors now widely in use are disposed to the horizontal. To be able to reduce the incline of the nailways 48 is of distinct advantage since such reduction lessens, to a considerable extent, the tendency of the nails delivered from the sluice portions 382 of the raceways 46 to ride over each other as they enter the upper portions of the nailways.

In order to rotate the nail roll 620 step by step in one direction to effect proper dumping of nails into the tubes 618 there is pivoted to the upper end of the lever 230 a pair of adjustable rods 636, 638 (Figs. 18, 21 and 22) the forward ends of which are pivoted to pawl carrying plates 640, 642 journaled upon the collar 635 and arranged between the ratchets 632, 634.

Pivotally mounted upon studs 644, 646 (Figs. 19, 19A, 21 and 22) carried by the plates 640, 642 and biased by springs 648, 650 toward the ratchets 632, 634 are pawls 652, 654. Slidingly mounted in a guide 656 secured to the carrier 44 is a detent 658 having a slot 660 for receiving a stud 662 which is carried by the guide and is constantly urged forward by a spring 664. When the cam 186 is operated in response to actuation of the nail loader arm 190 (Fig. 3) as above described, the lever 230 moves clockwise from its position illustrated in Fig. 21 causing the pawl 654 on the plate 642 to move the roll 75° counterclockwise as viewed in Fig. 6, to dump nails, then in one of the longitudinal series of passages 630 of said roll, into conduits 204 and causing one of two teeth of the detent 658 to engage one of a plurality of notches 666 in the ratchet 634 to hold the roll in position.

When the lever 230 reaches the rear end of its stroke the pawl 652 is arranged on the outer or cylindrical face of the ratchet 632 (Fig. 22) and during the first part of the forward or retractive movement of the lever 230 said pawl rides on said cylindrical surface to allow the roll 620 to dwell while the nails are being dumped, the detent 658 keeping the roll under control during said dwell. As the lever 230 continues to swing forward the pawl 652 engages one of four notches of the ratchet 632, causing the nail roll 620 to move an additional 15° counterclockwise as viewed in Fig. 18 to aline nail passages 630 of the other series of pairs of passages with the nailways 48, the machine then coming to rest.

There may be used in place of the roll 620 a roll 668 which is illustrated in Fig. 20A and has formed in it two longitudinal series of nail receiving passages 670 which extend transversely through the roll, the passages of said series lying in longitudinal median planes respectively of the roll which are arranged at right angles to one another, the passages of one of said series of passages being offset longitudinally and circumferentially from the passages of the other series.

When a switch (not shown) has been turned on, an electric motor (not shown) drives the belt 58 which supplies power for vibrating the carrier 44, rotating the nail drum 54, and operating the nail roll 134 and the raceway and nailway clearers. The nails 50 are dumped from the buckets 52 of the nail drum 54 onto the upper ends of the raceways 46 and travel down the raceways and the nailways 48 into the passages 436 of the nail roll 134. When the loader block arm 190 of the heel attaching machine served by the distributor moves clockwise as viewed in Fig. 3, it causes the one revolution clutch housed in the cam 186 to be engaged, with the result that the cam is actuated to rock the nail roll 134 clockwise to dump the nails into the tubes 56 leading to the foot plate (not shown) of the machine and after a short dwell to move the nail roll back to its nail receiving position. During the cycle of operation of the nail roll 134 the shaker shaft assembly 136 is rendered inactive to stop vibration of the carrier 44. When the nail roll 134 arrives at its nail receiving position the shaker shaft assembly 136 is again rendered active to cause the carrier 44 again to be vibrated and nails to be fed into the passages 436 of the nail roll 134 preparatory to dumping the new load of nails when the loader block arm 190 is again actuated.

The invention having thus been described, what is claimed as new and what it is desired to secure by Letters Patent of the United States is:

1. In a nail distributor, a cylindrical nail roll having a longitudinal series of pairs of parallel nail receiving passages which extend transversely through the roll, the passages of each of said pairs of passages being arranged in alinement circumferentially of the roll and being spaced equal distances at opposite sides respectively of a plane which extends longitudinally through the roll and includes a diameter of said roll.

2. In a nail distributor, a cylindrical nail roll having two longitudinal series of nail receiving passages which extend transversely through the roll, the passages of said series lying in longitudinal median planes respectively of the roll arranged at right angles to one another, the passages of one of said series being offset longitudinally and circumferentially from the passages of the other series.

3. In a nail distributor, a cylindrical nail roll having two longitudinal series of pairs of passages which extend transversely through the roll, each pair of passages of both longitudinal series being in alinement circumferentially of the roll, the pairs of passages of one of said series being parallel to each other and passages of each pair of said one series being spaced equal distances at opposite sides respectively of a median longitudinal plane of the roll, the pairs of passages of the other series being parallel to each other and the passages of each pair of said series being spaced equal distances at opposite sides respectively of a median longitudinal plane of the roll arranged at right angles to the first-named plane, the pairs of passages of one series being staggered longitudinally and circumferentially of the roll with relation to the pairs of passages of the other series.

4. In a nail distributor, a cylindrical nail roll having one series of pairs of parallel passages which extend transversely through the roll and are spaced equal distances from a plane containing an axis of the roll, and a second series of pairs of parallel passages which extend transversely through the roll and are spaced equal distances from a plane containing said axis of the roll and disposed at right angles to the first-named plane, the pairs of passages of said one series being offset lengthwise and circumferentially of the roll from the passages of said second series of pairs of passages.

5. In a nail distributor, a cylindrical roll having two longitudinally arranged series of nail receiving passages which extend transversely through the roll, the passages of one of said series being offset longitudinally and circumferentially of the roll from the passages of the other series, a plurality of nail tubes each having a pair of branches, and means for rotating the roll step by step to move the passages of the two series alternately into positions in which nails may be dumped into said branches respectively.

6. In a nail distributor, a plurality of nailways, a cylindrical nail roll having a longitudinally arranged series of passages which extend transversely through the nail roll and are movable into register with alternate nailways to receive nails from said nailways, said nail roll having another longitudinally arranged series of passages which extend transversely through the nail roll and are angularly disposed to, and are offset longitudinally and circumferentially of, the roll from the passages of the first-named series, said passages of the second-named series being movable into register with nailways at opposite sides of the nailways into register with nailways with which the first-named series of transverse passages are brought, and conductors each having a pair of branches for alternately receiving nails from the first and second-named series of passages.

7. In a nail distributor, a plurality of nailways, a nail roll having two series of transverse passages which are spaced longitudinally of the roll, the passages of one of said series being staggered circumferentially and longitudinally of the roll with relation to the passages of the other series, a plurality of nail receiving conduits each of which has two entrances, and means for rotating the roll to aline in succession the passages of said one and other series with alternate nailways and thereafter with alternate entrances respectively of the conduits.

8. In a nail distributor, a rotatable roll having a plurality of nail receiving passages, a carrier having at its forward end a plurality of vertical slots, a stop for positioning nails fed into the passages of the roll, a front gate having flanges which extend into and form with the slots conduits for receiving said nails when said nails are dumped from the passages of the roll upon rotation of said roll, said flanges being constructed to be engaged by the head ends of said nails as they are dumped to guide said nails head ends down into the conduits, said gate being adjustable with relation to the carrier to vary the effective positions of its flanges in said slots in accordance with lengths of the nails in use.

9. In a nail distributor, a selector constructed and arranged to receive nails, guide means comprising a plurality of conduits for receiving nails from the selector, said conduits having upwardly diverging front and rear faces, said front faces being movable into different angularly adjustable positions with relation to said rear faces about an axis extending generally lengthwise of the selector and arranged in the vicinity of the lower end of the conduit in order to insure that the head ends of nails of different lengths shall effectively contact said front faces and be properly guided head ends down into the conduits.

10. In a nail distributor, a roll having nail receiving passages, guide means comprising a plurality of conduits, and mechanism for rotating the roll to dump nails arranged in the passages of said roll into the upper ends of said conduits, said conduits having upwardly diverging front and rear faces, said front faces being angularly adjustable toward and away from said rear faces about an axis extending generally lengthwise of the roll and arranged in the vicinity of the lower end of the conduit in order to insure that the head ends of nails of different lengths shall effectively contact said front faces and be properly guided head ends down into the conduits.

11. In a nail distributor, a nail carrier, a front gate mounted on said carrier, said carrier and said gate having interfitting portions forming nail receiving conduits, and means for moving the front gate into different positions upon the carrier to vary the lengthwise cross-sectional dimension of the conduits in accordance with the lengths of nails to be received by said conduits.

12. In a nail distributor, a nail carrier, a front gate pivotally mounted upon the carrier, a nail stop mounted upon the front gate, said carrier and front gate having interfitting portions forming nail receiving conduits, front and rear faces of which diverge upwardly, and means for setting the front gate in different angularly adjusted positions upon the carrier to vary the distance and the angle between the front and rear faces of the conduits in accordance with the lengths of nails to be received by said conduits.

13. In a nail distributor, a carrier, a roll which is rotatable in the carrier and has a plurality of nail receiving passages, a front gate pivoted upon the carrier, said carrier and front gate having interfitting slot and tongue portions forming conduits having vertical side faces and rear and front faces which converge downwardly, said conduits being constructed and arranged to receive nails dumped head ends first from the roll, and means for moving the front gate into different angularly adjusted positions upon the carrier to vary the distance of said front face of the conduit from said rear face and also to vary the angle at which the front face is disposed with relation to the rear face in accordance with the lengths of nails to be received by said conduits.

14. In a nail distributor, a carrier comprising a pair of blocks, a nail roll, said carrier and said blocks having opposed recesses for receiving trunnion portions of the roll, and latches for securing the blocks to the carrier to maintain the roll in its proper position on the carrier and for releasing the blocks for removal from the carrier preparatory to removing the roll from the carrier.

15. In a nail distributor, a carrier, a front gate having trunnions, a pair of plates which are supported by the carrier and which are movable laterally of the carrier and have bores in which the trunnions of the gate fit, springs for urging said plates into closed positions against faces of the carrier to support the front gate, said plates being manually moved away from said faces of the carrier to slide the plates off the trunnions of the front gate preparatory to removing said gate from the distributor.

16. In a nail distributor, a carrier, said carrier comprising a plurality of raceways having plateau and sluice portions along which nails travel, said plateau and sluice portions of the raceways being angularly disposed to form edges over which nails pass as they move from said plateau portions of the raceways, a balancing bar arranged opposite and spaced from said edges, a deflector which is secured to the balancing bar and which projects downwardly from said bar toward the sluice portions of the raceways, said deflector being constructed and arranged to be engaged by the head ends of nails after they have tilted over said edges to insure that said nails shall not somersault as they travel down the sluice portions of the raceways, and means for moving the balancing bar to vary the size of the gap between said bar and said edges in accordance with the lengths of nails being used and thus automatically adjusting the deflector to a different operating position with said bar.

WALLACE M. CUTLER.
MARY R. GREENOUGH,
Administratrix of the estate of Henry B. Greenough, deceased.
EDWIN S. KANT.

References Cited in the file of this patent

UNITED STATES PATENTS

| Number | Name | Date |
|---|---|---|
| 1,005,303 | Pope | Oct. 10, 1911 |
| 1,771,050 | Lund | July 22, 1930 |

FOREIGN PATENTS

| Number | Country | Date |
|---|---|---|
| 242,333 | Switzerland | Oct. 1, 1946 |